Figure 5:
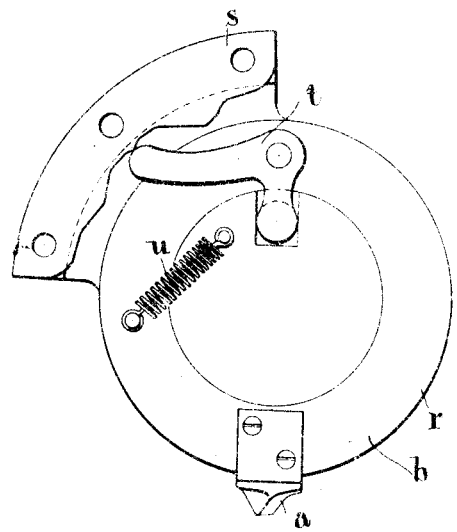

F. W. LANCHESTER.
APPARATUS FOR CUTTING WORM GEAR.
APPLICATION FILED JUNE 29, 1912.
1,128,613.
Patented Feb. 16, 1915.
5 SHEETS—SHEET 1.
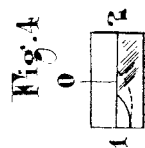
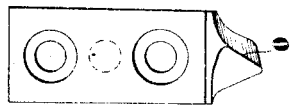
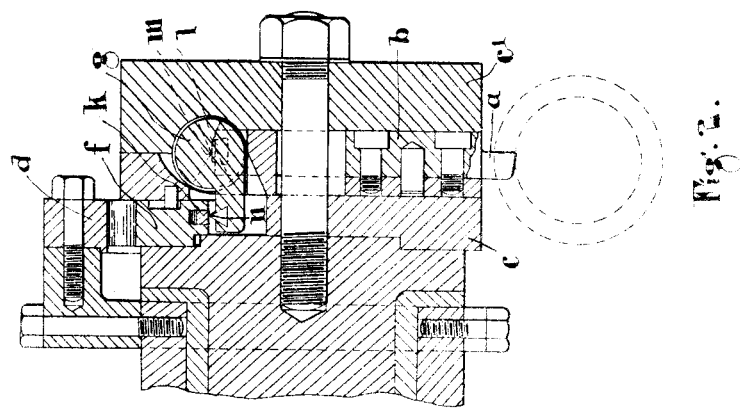
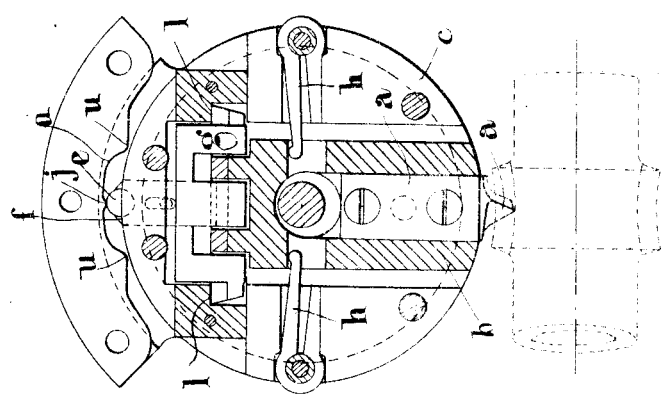
Witnesses
H. L. Alden
H. M. Barrett
Inventor
Frederick W. Lanchester
by Spear, Middleton, Donaldson & Spear
Attorneys F. W. LANCHESTER.
APPARATUS FOR CUTTING WORM GEAR.
APPLICATION FILED JUNE 29, 1912.

1,128,613.

Patented Feb. 16, 1915.

5 SHEETS—SHEET 3.

WITNESSES
Wehrling Stahl
O. E. Parsons

INVENTOR
Frederick W. Lanchester
BY
Spear, Middleton, Donaldson & Spear
ATTORNEYS F. W. LANCHESTER.
APPARATUS FOR CUTTING WORM GEARS.
APPLICATION FILED JUNE 29, 1912.

1,128,615.

Patented Feb. 16, 1915.
5 SHEETS—SHEET 4.

WITNESSES
Mehrling Stahl
C. E. Parsons

INVENTOR
Frederick W. Lanchester
BY
Spear Middleton
ATTORNEYS

F. W. LANCHESTER.
APPARATUS FOR CUTTING WORM GEAR.
APPLICATION FILED JUNE 29, 1912.
1,128,613.
Patented Feb. 16, 1915
5 SHEETS—SHEET 5.
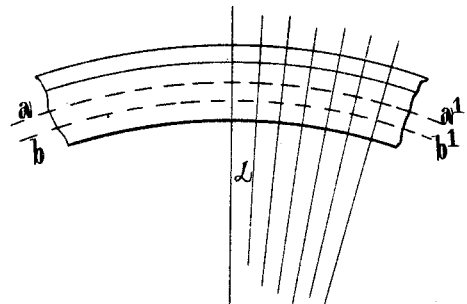
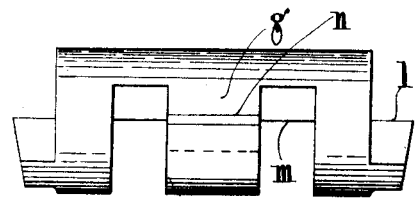
Fig. 17.
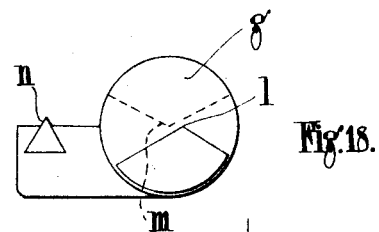
Fig. 18.
Fig. 14.
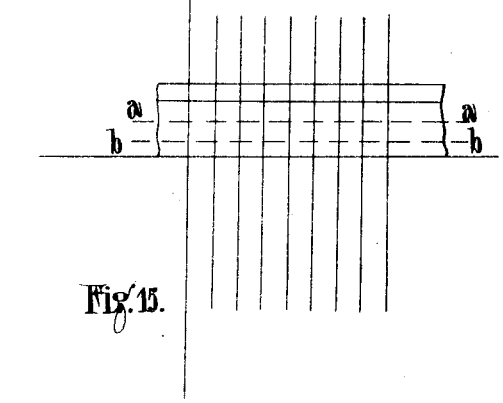
Fig. 15.
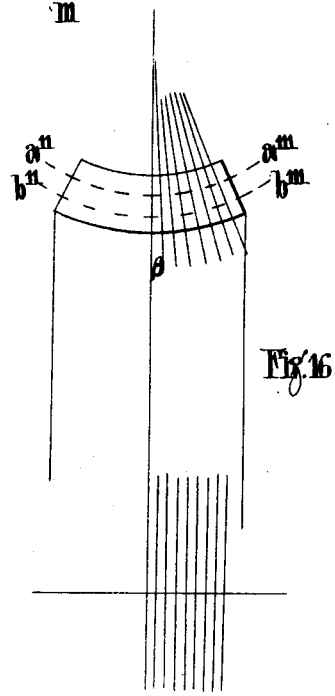
Fig. 16.
WITNESSES
Nehrling Stahl
C E Parsons
INVENTOR
Frederick W. Lanchester
BY
Spear, Middleton, Donaldson & Spear
ATTORNEYS

UNITED STATES PATENT OFFICE.

FREDERICK WILLIAM LANCHESTER, OF EDGBASTON, BIRMINGHAM, ENGLAND.

APPARATUS FOR CUTTING WORM-GEAR.

1,128,613.　　　　　Specification of Letters Patent.　　Patented Feb. 16, 1915.

Application filed June 29, 1912. Serial No. 706,725.

*To all whom it may concern:*

Be it known that I, FREDERICK WILLIAM LANCHESTER, a subject of the King of Great Britain and Ireland, residing at 53 Hagley road, Edgbaston, Birmingham, England, have invented a certain new and useful Improvement in Apparatus for Cutting Worm-Gear, of which the following is a specification.

The present invention relates to an improved method and means for generating or initiating the tooth form in worm gear of the hollow worm type, and the object of the invention is to produce worm gearing having teeth of such form as to stand heavy loads and give high efficiency, the teeth being brought to approximately their finished form without the necessity of any subsequent correcting.

In the manufacture of worm gear it has been my practice to cut out the form of the teeth by a machine such as is described in my British Patent No. 13433 A. D. 1897, but the form of tooth that is produced, unless subsequently modified, is not altogether satisfactory where the highest load capacity (for size) is required.

The present invention consists in a method and apparatus for shaping the teeth in the itting machine at once to the approximate form which will give the best results.

The invention also consists in varying the thickness of the teeth at various points by the movement of a cutter operated differentially to the cutter head.

The invention further consists in a machine having a rotating cutter head and a cutting tooth mounted so that it can be moved relatively to such head so as to vary the thickness of the teeth cut in the blank from which the worm is to be formed, or in a tool or hob to be used in the production of the gear.

The invention also consists in improved worm gear in which the teeth are thinner in the neck of the worm and also at the ends than they are at the mean radial position.

Figure 6:
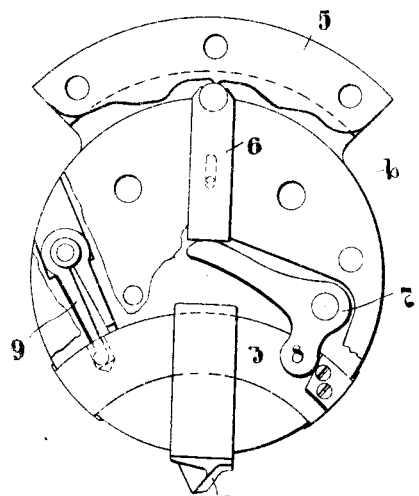
Figures 8, 9:
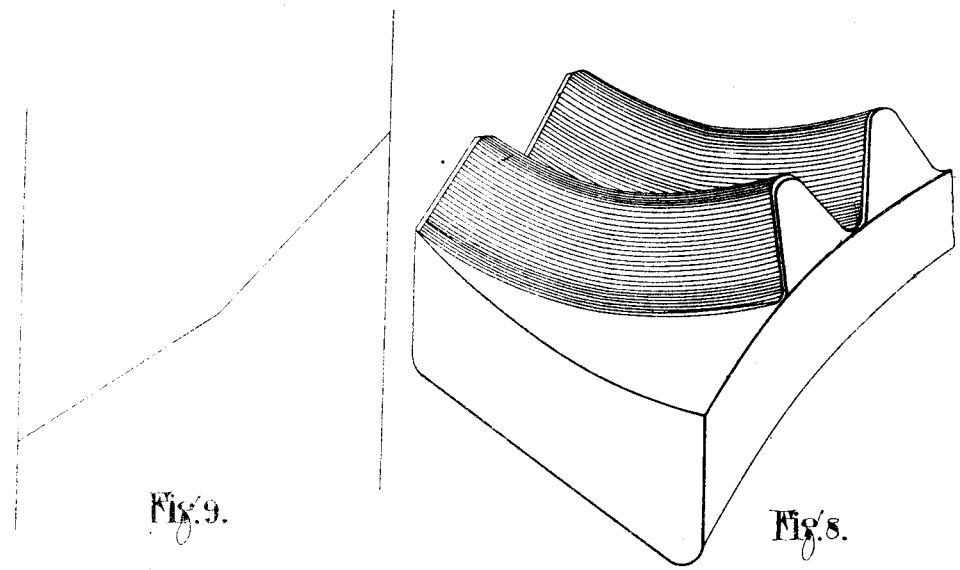
Figures 10, 11:
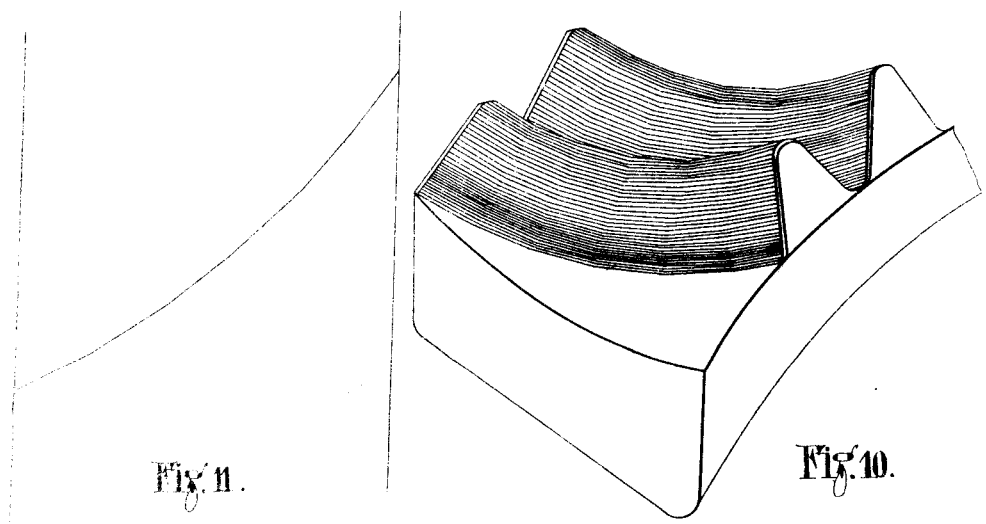
Figure 12:
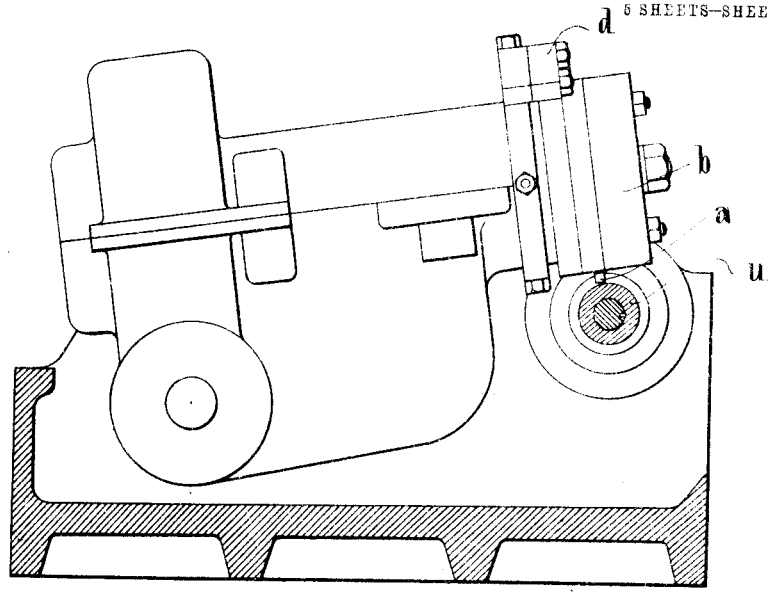
Figure 13:
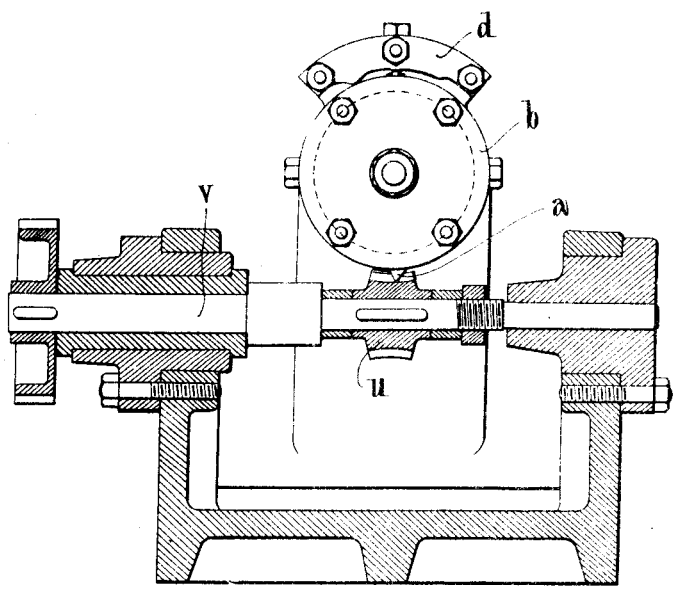

Referring to the accompanying drawings, Figures 1 and 2 are sections at right angles to each other through the cutter head, showing also the cam which operates the cutter; Fig. 3 is an elevation, and Fig. 4 an underside plan of the cutter tooth. Fig. 5 shows diagrammatically a modified form of the invention in which the cutter is given a variable circumferential motion: Fig. 6 shows a modification in which the cutter is given an angular motion, Fig. 7 being a transverse section of the arrangement shown in Fig. 6. Fig. 8 shows in a somewhat exaggerated form the face of a tooth of a worm wheel as ordinarily constructed; Fig. 9 is a diagrammatic plan of Fig. 8; Fig. 10 shows the face of a worm wheel tooth embodying the present invention; Fig. 11 is a digrammatic plan of Fig. 10. Fig. 12 is a side elevation of the complete machine. Fig. 13 is an end elevation partly in section of the machine. Figs. 14, 15 and 16 show the method of development adopted in obtaining the diagrammatic views shown in Figs. 9 and 11. Figs. 17 and 18 are detailed views of the lever operating the cutter shown in Fig. 1.

In worm wheel teeth as usually constructed, the finished surface of the tooth approximates to two curved surfaces making a slight angle with one another as shown in Figs. 8 and 9. The result of this is that when working in conjunction with a worm in passing over any given tooth the thread of the worm changes over from one surface to the other of the tooth, and for an instant the whole driving pressure is borne by the angle formed by the junction of the two surfaces. This causes overloading of the surface at this point, squeezing out of the oil film and destruction of the surface. In a worm wheel constructed according to the present invention these difficulties are overcome by giving to the tooth a form somewhat like that illustrated in Figs. 10 and 11. From Fig. 10 it will be seen that by the process of manufacture an almost continuous curved surface right across the whole width of the tooth is obtained.

In carrying the invention into effect according to one modification, in a machine of the type described in my Patent No. 13433 of 1897, the cutter $a$, instead of being fixed, is mounted on a slide $b$ so that it is capable of movement in a radial direction in the cutter head $c\ c'$. The slide $b$ carrying the cutter is moved in the radial direction by means of a cam $d$ bearing on a roller $e$ mounted on the sliding part $f$ by which the tool slide is operated through the medium of the lever $g$. This lever is shown in detail in Figs. 17 and 18. The lever $g$ turns about a fulcrum $l\ l$ and presses the cutter down by means of a knife edge $m$, the motion being communicated to the lever by the piece $f$ through the knife edge $n$. As shown, the lever gives a reduction of about 10 to 1. The cutter is held up against the cam $d$ through the lever $g$ by the springs $h$ $h$. The lever may be adjusted by means of the bearing piece $k$ at one end. The form of the cutter is clearly shown in Figs. 3 and 4 and cuts only on the edge $o$. In order to form this cutter the cutter blank is provided with a milled face and the center line 1, 2, of the cutting edge $o$ is scribed on the face so milled. The most convenient angle for the cutting edge is about 30° to the longitudinal axis of the tool. The cutter is then shaped to the form illustrated by milling and filing away the blank, taking the scribed line as the working line. In order to cut the opposite flank of the tooth worm the worm blank is turned end for end, or a cutter of opposite hand is employed.

The proportions of the arrangement illustrated in Figs. 1 to 4 are suitable for cutting a gear of about 4 to 1 ratio.

In the modification of the invention shown at Fig. 5, the cutter $a$ instead of moving radially, is given a circumferential motion, being mounted on the ring $r$ which is actuated in one direction by the cam $s$ operating on the lever $t$ and in the opposite direction by the spring $u$.

Figure 7:
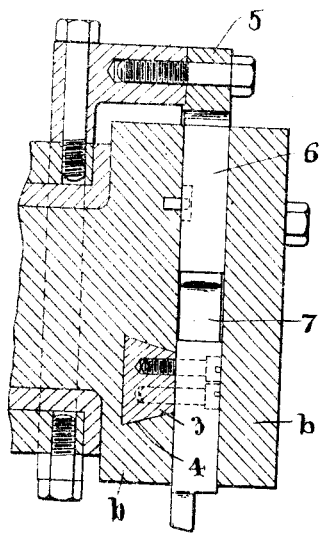

According to another modification illustrated in Figs. 6 and 7, the cutter $a$ is given an angular motion, being mounted on a slide 3 guided by a dove-tailed groove 4 in the cutter head $b$. The angular movement of the cutter is effected by the cam 5 acting on the sliding piece 6 which bears on one end of the lever 7 whose other end 8 operates the slide 3. The slide is pressed by the spring 9 in the direction to keep the roller up against the cam. The motion of the tool is thus made eccentric to the cutter head, and the extent to which the top and bottom of the tooth cut are altered in form is rendered variable. The required position of the cutter for the top and bottom of the tooth is determined geometrically from the form of tooth required, and the motion of the cutter is then so chosen as to give the required variations.

The whole machine is shown assembled in Figs. 12 and 13. The cutter head $b$ is mounted so as to rotate in suitable bearings about an axis at right-angles to the axis of the spindle $v$, on which the work is mounted, the cutter head and worm being caused to rotate at the desired speed by any suitable known means.

In order to understand the form of tooth which is to be made in the worm gear it should be pointed out that in the Hindley type of worm gear on which the present gear is an improvement, each concentric element of the wheel tooth surface continuously engages with the corresponding element of the worm, and does not, as in the ordinary tooth gearing, change its relative position to the worm tooth during its period of engagement. The result of this is that each concentric surface of the gear and its worm can be considered quite apart from the rest of the gear teeth, in other words the total gear tooth form consists of an arbitrary series of concentric laminæ supposed in the limit to become indefinitely thin so as to avoid any steps in the tooth form. The gear tooth form in the ordinary sense of tooth form is thus emancipated from all ordinary considerations of rolling contact, and the arbitrary form assigned by the designer is merely based on the considerations of manufacture and of assembling the parts, that is to say the tooth is preferably made of an angular section so as to be readily generated and of such a steepness of slope as will avoid undercut such as would prevent a gear wheel and its worm being put into mesh or taken apart.

In practice an angle of about 1 in 2 slope or say 30° that is to say a contained worm angle of about 55 to 60° (such as employed in an ordinary Whitworth or Sellar's bolt) is found to give satisfactory results. It will be understood from the above that the corrections, etc., of tooth form given by the machine above described do not relate to corrections as to the V form of tooth but they relate to corrections such as can be represented by the development of one of the laminæ elements of the gear such as illustrated by Figs. 9 and 11. It should be noted that the correction is actually applied to the worm but it is directed to obtain the result stated for the wheel.

In Figs. 14, 15 and 16 the method of obtaining the developed view Figs. 9 and 11 is shown.

The laminæ $a$, $a'$, $a''$, $a'''$, are developed by making equal increments of abscissæ, Fig. 15, represent equal increments of the angle $\alpha$ Fig. 14, while in Fig. 16 equal increments of abscissæ represent equal increments of the angle $\beta$. The intersection of a tooth face with the laminæ is then plotted giving for the ordinary worm the result shown in Fig. 9, and for a worm constructed according to the invention the result shown in Fig. 11.

Having now described my invention, what I claim as new and desire to secure by Letters Patent is:—

1. A machine for cutting worm wheel teeth, comprising in combination a rotating cutter head, means for rotating a blank in proximity to said head, a cutter movable in a radial direction in said cutter head, and fixed means controlling the movements of said cutter relatively to said head, as and for the purposes described.

2. A machine for cutting worm wheel teeth, comprising in combination a rotating cutter head, means for rotating a blank in proximity to said head, a cutter movable in a radial direction in said cutter head, and a fixed cam surface controlling the movement of said cutter relatively to said head, as and for the purposes described.

3. A machine for cutting worm wheel teeth, comprising in combination a rotating cutter head, means for rotating a blank in proximity to said head, a cutter movable in a radial direction in said cutter head, and a fixed cam surface controlling the movement of said cutter relatively to said head, said cam having a recess formed therein and two projecting surfaces on the two sides of said recess, as set forth.

In testimony whereof, I affix my signature in presence of two witnesses.

FREDERICK WILLIAM LANCHESTER.

Witnesses:
JOHN MORGAN,
FRANCIS MALPAS.